Nov. 10, 1959 P. B. LAVANCHY 2,912,348
PRODUCT AND METHOD OF MANUFACTURE
Filed April 13, 1956
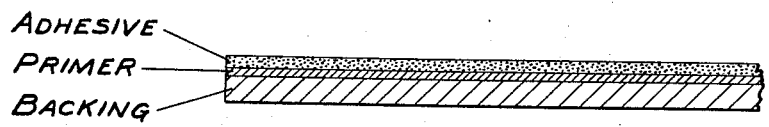
ADHESIVE
PRIMER
BACKING
INVENTOR.
PATRICIA BJERREGAARD LAVANCHY
BY
Morgan, Finnegan, Durham & Pine
ATTORNEYS.

United States Patent Office 2,912,348
Patented Nov. 10, 1959

2,912,348
PRODUCT AND METHOD OF MANUFACTURE

Patricia Bjerregaard Lavanchy, Drexel Hill, Pa., assignor, by mesne assignments, to Johnson & Johnson, New Brunswick, N.J., a corporation of New Jersey Application April 13, 1956, Serial No. 577,984

12 Claims. (Cl. 117—76)

This invention relates to pressure-sensitive adhesive sheets and tapes. It is concerned particularly with the firm adherence of pressure-sensitive adhesives to their backings, and particularly to hydrophilic backings, preferably of the film type.

Pressure-sensitive adhesive tapes require secure bonds of the tacky pressure-sensitive adhesive to the backings so as to prevent transfer of adhesive when the tacky surface of the tape is pressed into contact with itself, or with a part of the backing, and then pulled apart or if the tape is removed from a surface to which it previously had been adhered. Such bonding is accomplished usually by interposing a primer coat between the pressure-sensitive adhesive layer and the flexible backing. The primer films of the prior art are usually two phase primers consisting, for instance, of a mixture of latex rubber and of hydrophilic material having affinity for the hydrophilic film backing. Such primers fail to firmly bond the adhesive tape when it is subjected to moisture and exhibit particularly poor anchorage in humid climates. Another disadvantage is their capacity, which affects the finished roll of tape, to make it appear muddy-colored and unsightly. Also, many of the primers of the prior art are water base primers which cause curling and distortion of the flexible backing during processing. Moreover, a large number of the heretofore used primers require heat treatments which cause the backing to dry out and become brittle.

Accordingly, it is an object of this invention to provide new and improved pressure-sensitive adhesive products, particularly sheets and tapes. It is a further object of the invention to provide adhesive sheets having improved anchorage of the adhesive mass on the backings. Still another object is to provide such anchorage permanently and under adverse conditions of high humidity with resultant condensation of moisture on the tape. A particularly important object of the invention is the provision of improved primers for use on normally tacky and pressure-sensitive adhesive products having backings such as cellulosic backings, especially regenerated cellulose and cellulose acetate, or backings of other hydrophilic materials, glue and casein, and particularly having such backings in film form. A further important object of the invention is the bonding of backing to adhesive in normally tacky and pressure-sensitive adhesive products to prevent transfer of adhesive under all circumstances. Further objects are the provision of a clear cohesive primer providing good anchorage, and of a primer that is clear and colorless, providing clear-colored and neat looking adhesive tape products, and of a method of making such primer and providing such adhesive products. A still further object of the invention is to provide a primer which when applied to a backing will not cause a curling or distortion thereof during processing. A still further object of this invention is to provide a primer requiring no heat cycles in applying it to a backing causing it to become brittle. Still further objects of the invention will be more obvious from the following specification.

In accordance with the present invention a primer is prepared utilizing an organic solvent (e.g. hydrocarbon solvent), at least one or more milled elastomers and a titanate compound having the formula $(RO)_4Ti$ wherein R is an alkyl radical, and preferably an alkyl radical having from one to ten carbon atoms. More specifically, the primer is prepared by milling one or more elastomers until a fluid solution can be obtained by dissolving in an organic solvent and adding to a dilute solution of the broken down or milled elastomer, a minor proportion, preferably one part to each one to 100 parts of elastomer, of at least one titanate compound having the formula indicated hereinabove.

Among the elastomers preferred for the purpose of the present invention are polyisoprene such as broken down crude rubber and the copolymers of butadiene and monovinyl monomers such as styrene, wherein the diene consists of 40 or more percent by weight. Examples of preferred titanates employed in this invention are tetra isopropyl titanate (TPT) and tetra n-butyl titanate (TBT). Other titanates which may be utilized, but not as successfully, include tetra ethyl titanate, tetra-pentyl titanate and tetra decyl titanate. Higher titanate esters, although useful, are not particularly desirable because of their tendency to react much slower than the lower alkyl titanates, thereby requiring much longer aging periods between priming and coating.

It has been found that the principal constituents of the primer of this invention combine to produce a most effective organic base primer for conventional normally tacky and pressure-sensitive adhesive compositions. The elastomer used in accordance with this invention possesses a high degree of affinity for the conventional normally tacky and pressure-sensitive adhesives, while the titanates possess an affinity for and probably react with the hydrophilic film. Advantageously, the primer composition is free of water thus avoiding the hazards encountered when using a water base primer as heretofore indicated.

The primer of this invention is preferably applied to a hydrophilic base in a very thin coat at a coating weight of about one hundredth to about one-quarter of one ounce dry weight per square yard dry weight, and dried for a short time at moderate temperatures. The lower weights of primer are most suitable for films while the upper range is used for woven or non-woven fibrous backings. A pressure-sensitive adhesive compound may then be applied to the primed sheet at a dry coating weight of from about one-half to about five ounces per square yard. For best results, the primer and adhesive are both applied from compatible elastomer solvents, e.g. toluene.

As shown in the accompanying drawing the primer is coated on one side of the backing and the adhesive is coated over the primer coat, the primer coat anchoring the adhesive coat to the backing.

The following are examples of organic base primers formed in accordance with this invention. It will be appreciated that these formulations are exemplary and the invention should not be construed as limited to the particular materials and proportions indicated; all proportions recited are in parts by weight.

EXAMPLE I

The primer material is prepared by milling pale crepe rubber twenty-five passes through a hand tight conventional rubber mill (approximately 1 mil nip opening). The milled rubber is then dissolved in toluene and diluted to 10% solids. To this dilute solution of the broken down rubber is added 0.5 part of tetra isopropyl titanate for each 99.5 parts of rubber. The mixture is then thoroughly mixed by use of a suitable stirrer.

Examples of additional primer compositions prepared in accordance with the method of Example I are shown below in Table I. The reference "TPT" refers to tetra isopropyl titanate; "TBT" refers to tetra butyl titanate; and "G.R.S." refers to a copolymer of butadiene and styrene (50:50).

*Table I*

| Example | Elastomer | Titanate | Ratio, Elastomer/Titanate |
|---|---|---|---|
| II | Pale Crepe | TPT | 1/1 |
| III | do | TBT | 97/3 |
| IV | G.R.S. | TBT | 90/10 |
| V | Pale Crepe | TPT | 97/3 |
| VI | do | TBT | 96/4 |
| VII | do | TPT | 50/50 |

In forming adhesive tapes in accordance with the present invention, the primer is coated on the backing sheet by any conventional method such as spraying, printing, knife coating, or reverse roll coating. The backing sheet is held for a period of time in order to allow the reaction between titanate and backing film to occur. Generally, a time period in the range of one to seven days is adequate. As indicated heretofore, a normally tacky and pressure-sensitive adhesive composition is then applied to the primed backing by any conventional coating method, as for example those indicated hereinabove suitable for coating the primer.

Although the present invention is primarily concerned with primer compositions to be used on hydrophilic backing elements, such as regenerated cellulose films ("cellophane"), hydroxy alkyl cellulose ethers, methyl cellulose, and certain hydrophilic types of ethyl cellulose, it should be appreciated that such primers may be used on less hydrophilic films if desired.

The following are examples of normally tacky and pressure-sensitive adhesive tapes formed in accordance with this invention, the backing sheets being primed with primer compositions of the present invention.

EXAMPLE VIII

A 1.5 mil cellophane sheet was coated with the primer composition of Example I to a coating weight of about 0.01 of one ounce per square yard and dried for one day at about 20° C. A pressure-sensitive adhesive (Adhesive A) having the following recipe:

ADHESIVE A

Milled pale crepe rubber _____ 100
Polybetapinene resin _____ 75
Petroleum oil _____ 5
Polymerized trimethyldihydroquinoline _____ 2 in the form of a solution was applied to the primed sheet from an 18% by weight solution in heptane to produce a dry coating weight of approximately 0.8 ounce per square yard.

EXAMPLE IX

A 1.5 mil cellophane sheet was coated with the primer composition of Example II to a coating weight of about 0.01 of one ounce per square yard and dried for one day at about 20° C. The pressure-sensitive Adhesive A disclosed in above Example VIII in the form of a solution was applied to the primed sheet from an 18% by weight solution in heptane to produce a dry coating weight of approximately 0.9 ounce per square yard.

EXAMPLE X

A 1.5 mil cellophane sheet was coated with the primer composition of Example III to a coating weight of about 0.01 of one ounce per square yard and dried for four days at 20° C. A pressure-sensitive adhesive (Adhesive B) having the following recipe:

ADHESIVE B

Milled smoked sheet rubber _____ 100
Zinc oxide _____ 50
Dehydrogenated rosin _____ 75
Sym. di-beta-napthyl-para-phenylene diamine ____ 2
Lanolin _____ 10 in the form of a solution was applied to the primed sheet from a 35% by weight solution in toluene to produce a dry coating weight of approximately 1.1 ounce per square yard.

EXAMPLE XI

A 1.5 mil cellophane sheet was coated with the primer composition of Example IV to a coating weight of about 0.01 of one ounce per square yard and dried for six days at 26° C. A pressure-sensitive adhesive (Adhesive C) having the following recipe:

ADHESIVE C

Butadiene-styrene copolymer (butadiene-styrene ratio 70:30, Mooney value 50) _____ 50
Smoked sheet _____ 50
Ester of hydrogenated rosin _____ 50
Polybetapinene resin _____ 16
Polymerized trimethyldihydroquinoline _____ 2
Petroleum oil _____ 20 in the form of a solution was applied to the primed sheet from a 20% by weight solution in toluene to produce a dry coating weight of approximately 0.8 ounce per square yard.

EXAMPLE XII

A 1.5 mil cellophane sheet was coated with the primer composition of Example V to a coating weight of about 0.01 of one ounce per square yard and dried for six days at 20° C. The pressure-sensitive Adhesive A disclosed in above Example VIII in the form of a solution was applied to the primed sheet from an 18% by weight solution in heptane to produce a dry coated weight of approximately 0.8 ounce per yard.

EXAMPLE XIII

A 1.5 mil cellophane sheet was coated with the primer composition of Example VI to a coating weight of 0.01 of one ounce per square yard and dried for three days at 20° C. The pressure-sensitive Adhesive C disclosed in Example XI in the form of a solution was applied to the primed sheet from a 20% weight solution in toluene to produce a dry coating weight of approximately 0.8 ounce per square yard.

EXAMPLE XIV

A 1.5 mil cellophane sheet was coated with the primer composition of Example VII to a coating weight of about 0.01 of one ounce per square yard and dried for one day at 20° C. A pressure-sensitive adhesive (Adhesive D) having the following recipe:

ADHESIVE D

Polyvinyl ethyl ether resin—intrinsic viscosity =2.37 _____ 100
Hydrogenated rosin _____ 5
Phenylalpha naphthylamine _____ 0.35
Polyethylene glycol 400 (di, tri) ricinoleate _____ 1.5 in the form of a solution was applied to the primed sheet from a 15% by weight solution in toluene to produce a dry coating weight of approximately 0.8 ounce per square yard.

Anchorage tests were conducted for the primed sheets disclosed in the above Examples VIII–XIV. The amount of adhesive coated on the primed sheets was not the amount indicated in Examples VIII–XIV, but rather 2 ozs. of adhesive in each case. While the adhesive is still wet, 80 x 80 cloth is firmly pressed into the adhesive and the laminated structure is then dried. One inch wide strips are cut from the sheet. In testing for wet anchorage, the strips are immersed in water for 1 hour, after which the cloth is separated from the cellophane by the peel-back method of stripping in a tensile machine with a lower jaw speed of 33 inches per minute. In testing for dry anchorage, the strips are not wetted before the cloth is separated from the cellophane. The anchorage value is the average force in ounces per inch width recorded on the tensile machines. Anchorage values for the primed sheets of Examples VIII–XIV are as follows:

| Example | Anchorage | |
|---|---|---|
| | Dry, g. | Wet, g. |
| VIII | 520 | 15 |
| | No primer | 0 |
| IX | 330 | |
| X | 520 | 100 |
| XI | 670 | 190 |
| XII | 1300 | 75 |
| XIII | 750 | 235 |
| XIV | 575 | 175 |
| | 500 | 75 |

From the above data, it is seen that the titanate containing primers of this invention provide adhesive sheets having improved anchorage of the adhesive to hydrophilic backings. Advantageously, the novel primer compositions improve anchorage under adverse conditions of high moisture. Since these primer compositions are not of the water base type, they may be applied to a backing without causing a curling or distortion thereof during processing. Also, they do not require heat cycles in their application to a backing, thus avoiding the possibility of drying out said backing, causing it to become brittle.

The invention in its broader aspects is not limited to the specific steps, processes, compositions, combinations and improvements described, but departures may be made therefrom within the scope of the accompanying claims without departing from the principles of the invention and without sacrificing its chief advantages.

What is claimed is:

1. A normally tacky and pressure-sensitive adhesive tape comprising a hydrophilic film backing, a primer coating thereon comprising at least one elastomer and a minor amount of a titanate having the formula $(RO)_4Ti$ wherein R is an alkyl radical, and a second coating on said primer coating of a normally tacky and pressure-sensitive adhesive compatible with said primer coat.

2. An adhesive tape in accordance with claim 1 wherein R is an alkyl radical having from one to ten carbon atoms.

3. An adhesive tape in accordance with claim 1 wherein the elastomer is selected from the group consisting of polyisoprene and copolymers of butadiene and styrene.

4. An adhesive tape in accordance with claim 1 wherein the titanate is in an amount of 1 part to 1–100 parts of elastomer.

5. An adhesive tape in accordance with claim 1 wherein the titanate is tetra-isopropyl titanate.

6. An adhesive tape in accordance with claim 1 wherein the titanate is tetra-n-butyl-titanate.

7. The method of manufacturing a normally tacky and pressure-sensitive tape comprising the step of breaking down an elastomer until an organic fluid solution can be obtained, adding for each 1–100 parts of elastomer 1 part of a titanate having the formula $Ti(OR)_4$ wherein R is an alkyl group, coating said composition on a hydrophilic film base, and applying thereon a normally tacky and pressure-sensitive adhesive composition compatible with the primer.

8. The method in accordance with claim 7 wherein R is an alkyl radical having from one to ten carbon atoms.

9. The method in accordance with claim 7 wherein the elastomer is selected from the group consisting of polyisoprene and copolymers of butadiene and styrene.

10. The method in accordance with claim 7 wherein the titanate is in an amount of one part to 1–100 parts of elastomer.

11. The method in accordance with claim 7 wherein the titanate is tetra-isopropyl titanate.

12. The method in accordance with claim 7 wherein the titanate is tetra-n-butyl-titanate.

References Cited in the file of this patent

UNITED STATES PATENTS

| | | |
|---|---|---|
| 2,431,001 | Sullivan | Nov. 18, 1947 |
| 2,643,984 | Boyd | Feb. 9, 1950 |
| 2,726,967 | Eger | Dec. 13, 1955 |
| 2,750,307 | Bemmels | June 12, 1956 |
| 2,750,316 | Berge | June 12, 1956 |
| 2,751,314 | Keil | June 19, 1956 |